Patented Aug. 1, 1933

1,920,637

UNITED STATES PATENT OFFICE 1,920,637

DEVELOPMENT OF OIL FIELDS

Henry L. Doherty, New York, N. Y.

No Drawing. Application September 5, 1925
Serial No. 54,817

5 Claims. (Cl. 166—21)

This invention relates to the development of oil fields and more particularly to a method of treating an oil body in a manner which will enable a more complete extraction of the oil to be had from the oil sands than is possible by existing methods of oil production.

Oil in its natural condition in the oil sands contains a great deal of dissolved gas—the greater the pressure on the oil the greater the volume of gas dissolved in the oil. Oil bodies are also usually found associated with considerable bodies of free or segregated gas, which overlie the oil body and which may extend into domes or chambers lying under the rock cap that usually covers the oil sands.

When the oil wells are first opened to the flow of oil and gas, the gas production is usually excessive. Some of the gas which is produced with the oil is that gas which has come out of solution from the oil due to the reduction of pressure following the opening of the well. By far the greater portion of the gas, however, is free or segregated gas which has migrated through the upper stratum of the oil sands from the reservoir or dome above the oil body. This upper stratum for convenience may be termed the gas sand and is usually more or less free from oil.

The principal force in causing the flow of oil from the oil sands is that gas which is dissolved in the oil and which passes out of solution therefrom as the pressure decreases. When the gas is allowed to come out of solution suddenly it tends to expand through the entire body of the oil and in so doing it imparts a foamy or yeasty consistency to the oil in which condition it is usually expelled from the well. However, if there is no sudden release of pressure the gas tends to come out of solution in rather small bubbles and without imparting a foamy condition to the oil and consequently will not cause any swelling of the oil in the sands. The result is that the gas escapes without forcing the oil through the sands toward the point of low pressure. When substantially all of the gas has passed out of solution the oil becomes what is known as "dead oil" and if it finds its way at all to the wells it probably does so under the influence of gravity and must be pumped out from the bottom of the well.

The action of the gas in the oil may be compared to certain kinds of carbonated liquids such as beer and the like. If the gas in a bottle of beer is allowed to escape very slowly as by making a minute hole in the bottle cap, the gas will bubble up through the liquid without imparting any foaming to the same. On the other hand, if the bottle is uncorked suddenly the gas will expand so rapidly throughout the entire liquid as to expel practically all of the liquid in the form of foam.

As already indicated, when an oil well is first opened there is usually a flush production of oil, such flush production apparently being caused by the rapid release of pressure in the region of the well. However, after the well has been flowing for a time the oil production will usually decrease very materially.

In explaining why the oil production gradually diminishes, reference may again be made to the analogy already mentioned of the carbonated liquid. The area of the mouth of the bottle is quite large as compared with the surface area of the liquid contained within the bottle and consequently when the bottle cap is suddenly removed, the release of pressure is immediately made effective over the entire surface area of the liquid. As a consequence, there is a violent foaming or effervescence of the liquid on a sudden uncapping of the bottle. In an oil field, however, the area of the well opening is very small indeed as compared with the surface of the oil body which is subject to the pressure of the segregated or free gas. Consequently, the reduction of pressure while it has a pronounced effect in the immediate vicinity of the well, does not make itself felt very suddenly on those portions of the oil body considerably removed from the well. It is also apparent that the sand itself tends to offer a considerable resistance to the passage of the gas toward the well, more particularly that gas which comes out of solution from the oil inasmuch as such gas must pass through a greater or less thickness of oil wetted sands. As a consequence, the release of pressure on the oil body in the remoter regions of the well is comparable to the very gradual release in pressure through a minute opening in the bottle cap.

Again referring to the example of the carbonated liquid, it is found that if the gas is not allowed to escape through the minute opening for an unduly long period of time and if the bottle is shaken either before or immediately after the bottle cap is removed, the gas still remaining dissolved in the liquid will suddenly expand and carry the major portion of the liquid out through the mouth of the bottle in a foamy condition. The phenomenon is apparently due to the fact that the liquid is supersaturated with gas at the existing pressure. In other words, the liquid has the property of holding an excess of the gas in solution at the existing pressure and a shock tends to throw the excess gas out of solution to bring the oil gas mixture to an equilibrium at the existing pressure. The sudden shaking or jarring starts the gas expanding very rapidly with the resultant foaming of the liquid. The term "shock" may be conveniently employed to describe the disturbance necessary to cause a breaking down of the supersaturation of the oil with gas at the existing pressure. The natural gas dissolved in the oil behaves very much like the gas in carbonated liquids, more particularly as in beer. It will now be appreciated that the gas remaining dissolved in the oil and in the carbonated liquid, where the gradual release of pressure has not continued an unduly long period of time, possesses potential energy which upon sudden release can be caused to do work, that is to say, to expel the liquid through the opening.

The present invention proposes to take advantage of the potential energy of the gas dissolved in the oil to accomplish a more complete drainage of the oil from the sands than can be accomplished by present methods of oil production.

According to the present invention, oil wells will be projected into the oil sands in comparatively closely spaced relation and preferably according to some approved geometric pattern. Following the initial opening of the wells they will be allowed to flow oil and gas under any approved method of control, such control preferably including the maintaining of back pressure on the wells. When the production of oil begins to decline, the operator may justifiably assume that the gas is not coming out of solution from the oil rapidly enough to cause a foaming or effervescence of the oil.

In order to cause a foaming or effervescence of the oil and thus cause a further increased production of oil, I propose first to shut-in all of the wells for a time and pump natural gas in large volumes into the already provided oil wells in order to build up as rapidly as possible a rather localized region of high pressure around the respective wells and thereafter to suddenly lower the pressure very materially by allowing the gas to escape through the wells. By suddenly lowering the pressure a shock will be imparted to the oil body in the surrounding region of the wells and this shock will be sufficient to cause the gas to come out of solution from the oil rapidly and impart a foaming or yeasting which tends to move the oil toward the region of low pressure, viz., the well. After the required reduction of pressure has been effected, the wells will preferably be maintained under a suitable back pressure.

It may be noted at this point that the above described method of increasing the pressure differs very materially from those methods wherein the pressure is built up gradually so as to obtain a more or less uniform pressure over the entire oil body. By rapidly building up a localized pressure in the region of each well, the gas will not be given sufficient time to spread sufficiently fast to effect an equalization of pressure over the entire oil body. The oil in the immediate region of the well is the oil in greatest need of shock because there is less gas dissolved in such oil, the pressure on the oil being lower in the immediate region of the well than in regions more remote from the well. It will also be appreciated that the more completely the oil in the immediate region of the well can be removed from the sands, the less will be the amount of dead oil which must be forced out of the sands toward the wells by the live oil in the more remote regions of the wells in order that such live oil may reach the wells.

When the production of oil again declines following the first shock imparted to the oil body in the manner indicated, the wells will again be shut-in and the localized pressure built up and thereafter released as before in order to again shock the oil body sufficiently to cause a further release of gas from the oil body with consequent foaming of the oil. This method of operation will be repeated until the production of oil following the last shock is so little that the operator is justified in assuming that substantially all of the oil that is capable of recovery from the sands in the immediate region of the wells has been recovered. Thereafter, the wells will again be shut-in and the gaseous fluid may be pumped in more slowly so as to build up a more or less equalized pressure over the entire field in order that upon subsequent release of pressure, the oil in the more remote regions of the wells or between the respective wells will be caused to effervesce. By imparting shocks to the oil body in the order named it is believed that the greatest recovery of oil may be obtained. However, it is not desired to limit the invention to this particular method of procedure inasmuch as it is probable that some fields may advantageously be treated in a different order. While it is preferred to employ natural gas for building up the pressure, air may be used in case natural gas is not available.

While it is preferred that the gas pressure put on the oil body when localized pressure is employed and also when the entire oil body is subjected to equalized pressure, should be as high as the original rock pressure, or above such pressure, nevertheless, the invention is not necessarily limited to such pressure. On each successive shutting-in of the wells the ultimate pressure put on the field may gradually be decreased inasmuch as the supersaturation between the gas and the oil may be broken down by a sudden release of a less differential of pressure due to the gradually diminishing volume of gas remaining dissolved in the oil. One advantage of building up the pressure materially above the pressure existing between the gas and the oil in the oil sand is that some of the free gas will tend to be forced into solution in the oil and consequently when the pressure is again suddenly released an increased forming or yeasting of the oil will result.

As previously pointed out in a pending application, Serial No. 31,996, I have found that the viscosity of the oil varies inversely with the amount of natural gas dissolved in the same. By building up the gas pressure as high as possible while the wells are shut-in and thus forcing some of the gas into solution, the greater will become the fluidity of the oil.

While it is preferred to break down the supersaturation existing between the gas and oil in the manner above indicated, nevertheless, conditions may arise where other methods of shocking the oil sands may be resorted to. It has long been the practice to stimulate the flow of oil from wells which have practically ceased to flow by torpedoing the wells. I would resort to torpedoing of the oil sands, not so much with the idea of causing fractures in the sands—the object usually sought for in torpedoing under ordinary conditions—as to impart a shock to the oil sands and thus to cause the oil to effervesce. Inasmuch as the primary purpose of torpedoing in accordance with this invention would be to impart a shock to the oil sands the explosive charges need not necessarily be placed in the oil sands proper, it being sufficient that they be so placed that the concussion caused by the explosion will be communicated to the oil body.

Heretofore it has been common to produce oil through a well by allowing it to flow and then to shut-in the well for a time to permit the pressure to build up, thereafter again opening the well. In this operation, however, each well is treated individually and no special care is taken to open and shut-in one well with reference to the protection of an adjacent or other wells in the field. In accordance with the present invention the wells will be positioned comparatively closely and consequently as all of the wells are simultaneously opened a shock will be imparted suddenly over a substantially large area with a consequent foaming of the oil throughout a comparatively large area of the sand. Also, the close spacing of the wells makes it unnecessary for the oil and gas to travel long distances in reaching a region of low pressure.

It is also common to shoot or torpedo wells in a field but each well is treated individually and it is commonly found that the torpedoing of one well has little effect on adjacent wells. In torpedoing the wells according to the present invention an entire field or a large group of wells will be torpedoed simultaneously in order to more effectually produce the requisite shock to the oil sands. It will be apparent that where a large number of shots are made simultaneously that the shots in the individual wells need not be so large and consequently there will be little or no danger of destroying the casing or other parts or equipment in the well.

As has already been indicated the free or segregated gas is often times found in domes underlying the rock cap above the oil body. When conditions indicate that there is a body of gas confined in such a dome, the requisite shock necessary to cause the oil to effervesce may often times be effected by suddenly releasing some of the gas from such dome through wells projected into the dome, the sudden release of the gas from the dome making itself felt over a considerable area and causing a foaming or yeasting of the oil in lateral directions as well as upwardly, the wells in the immediate vicinity of the dome, however, profiting most from the stimulation thus given to the flow of oil. Furthermore, in view of the fact that this particular method of disturbing the equilibrium would ordinarily result in the loss of a considerable volume of natural gas, such plan or mode of operation would ordinarily be resorted to only under special conditions as, for example, after the other modes of imparting shock to the oil body had been tried. However, it is not intended to limit the invention to any particular order or method for imparting the requisite shock to the oil body for, as already indicated, some fields may advantageously be treated according to one method and other fields by another.

One method of enabling the operator to determine when it is advisable to shut-in the wells for the purpose indicated is to carefully note the condition of the oil flowing from the wells. If the oil is discharged from the wells in a foamy or yeasty condition the operator will be justified in assuming that the oil is being forced from the sands by the expansion of the gas dissolved in the oil. Foamy or yeasty oil is frequently referred to as "live oil" whereas oil which flows from the well in a more or less regular stream is known as "dead oil", meaning by that that there is very little gas remaining dissolved in the oil. When so-called "dead oil" is flowing from the well the operator may justifiably assume that the oil is flowing to the wells under the action of gravity and also possibly by being forced through the sands by the pressure of the free gas. When conditions indicate that the oil is approaching the dead oil condition the wells should be shut-in and the field treated in the manner already indicated in order to release the dissolved gas still remaining in the oil in the sands.

When the oil flowing from the wells has reached the dead oil condition the wells will usually produce an excessive amount of gas. The ratio of gas to oil should also therefore carefully be noted, the wells being shut-in when the gas produced is excessive. The ideal ratio of gas to oil would be such ratio that the amount of gas produced per barrel of oil would not be materially more than the volume of gas which would be dissolved in a barrel of oil at the particular pressure existing on the oil body at any given time.

What is claimed is:

1. A method of producing oil from an underground oil body under gas pressure comprising, shutting-in wells projecting into the oil body when the ratio of gas to oil produced reaches a predetermined point, rapidly building up a localized gas pressure in the region surrounding each well by pumping a gaseous fluid into the individual wells, opening the wells simultaneously to effect a sudden drop in pressure in the region of each well, and allowing oil and gas again to flow through the wells.

2. A method of producing oil from an underground oil body under rock pressure comprising, shutting-in a plurality of wells projecting in closely spaced relation into said body when the ratio of gas to oil produced reaches a predetermined point, building up a localized gas pressure as rapidly as possible in the region surrounding each well by pumping a gaseous fluid into the individual wells simultaneously in large volumes, opening the wells simultaneously to effect a sudden drop in pressure in the region of each well, and controlling the flow of oil and gas following the sudden reduction of pressure by maintaining the wells under back-pressure.

3. A method of producing oil from an underground oil body under gas pressure comprising, shutting-in each of a group of wells projecting into said body when the ratio of gas to oil produced reaches a predetermined point, rapidly building up a localized gas pressure in the region surrounding each well by pumping a gaseous fluid into the individual wells, opening the wells simultaneously to effect a sudden drop in pressure in the region of each well and thereby shock said oil body, allowing oil and gas again to flow through the wells under the propulsive force of gas suddenly released from supersaturated solution in the oil body by said shock, again shutting in the wells when the ratio of gas to oil reaches a predetermined point, building up the gas pressure suddenly as before, and thereafter alternately lowering and building up the pressure in the manner specified.

4. A method of producing oil from an underground oil body under gas pressure comprising, shutting-in a plurality of wells projecting in closely spaced relation into said body when the ratio of gas to oil produced reaches a predetermined point, thereafter for a period successively building up a localized gas pressure as rapidly as possible in the region surrounding each well by pumping a gaseous fluid into the individual wells simultaneously in large volume, opening all the wells simultaneously to effect a sudden drop in pressure in the region of each well, allowing oil and gas to again flow through the wells, and again shutting-in the wells, subsequently holding the wells closed while gradually building up a substantially uniform equalized pressure over the entire oil body by pumping a gaseous fluid into the sand, and again suddenly reducing the pressure and allowing oil and gas to flow through the wells.

5. A method of producing oil from an underground oil body under gas pressure comprising, shutting-in wells projecting in closely spaced relation into said body when the ratio of gas to oil produced reaches a predetermined point, building up the gas pressure as rapidly as possible in the region surrounding each well by pumping a gaseous fluid into the individual wells simultaneously in large volumes, opening the wells simultaneously to effect a sudden drop in pressure in the region of each well, allowing oil and gas to again flow through the wells, again shutting-in the wells, gradually building up a substantially uniform pressure over the entire oil body by pumping a gaseous fluid into the sand, and again suddenly reducing the pressure at all of the wells simultaneously and allowing oil and gas to flow through the wells, all of the wells following each shutting-in period being preferably maintained under a back pressure.

HENRY L. DOHERTY.